(12) United States Patent
Maan

(10) Patent No.: US 10,944,847 B2
(45) Date of Patent: Mar. 9, 2021

(54) APPARATUSES, SYSTEMS, AND METHODS FOR SELECTIVE ACCESSIBILITY OF CONTENT FROM A CONTENT-POOL

(71) Applicant: Narendra Singh Maan, Panipat (IN)

(72) Inventor: Narendra Singh Maan, Panipat (IN)

(*) Notice: Subject to any disclaimer, the term of this patent is extended or adjusted under 35 U.S.C. 154(b) by 116 days.

(21) Appl. No.: 15/710,827

(22) Filed: Sep. 20, 2017

(65) Prior Publication Data

US 2018/0084076 A1 Mar. 22, 2018

Related U.S. Application Data

(60) Provisional application No. 62/397,187, filed on Sep. 20, 2016.

(51) Int. Cl.
| | | |
|---|---|---|
| *G06F 15/173* | (2006.01) | |
| *H04L 29/08* | (2006.01) | |
| *H04L 29/06* | (2006.01) | |
| *H04W 4/08* | (2009.01) | |
| *H04W 4/21* | (2018.01) | |

(52) U.S. Cl.
CPC .......... *H04L 67/32* (2013.01); *H04L 63/10* (2013.01); *H04L 67/306* (2013.01); *H04L 67/36* (2013.01); *H04W 4/08* (2013.01); *H04W 4/21* (2018.02)

(58) Field of Classification Search
CPC ....... H04L 67/32; H04L 67/36; H04L 67/306; H04L 63/10; H04W 4/21; H04W 4/08

USPC .......................................................... 709/225
See application file for complete search history.

(56) References Cited

U.S. PATENT DOCUMENTS

| | | | | |
|---|---|---|---|---|
| 6,704,787 | B1* | 3/2004 | Umbreit | G06F 21/31 340/512 |
| 6,769,010 | B1* | 7/2004 | Knapp | G06F 16/9535 709/203 |
| 2005/0086503 | A1* | 4/2005 | Ranner | G11B 19/04 713/193 |
| 2008/0133544 | A1* | 6/2008 | Fujimoto | H04N 21/4126 |
| 2011/0173683 | A1* | 7/2011 | Roach | H04L 63/20 726/4 |
| 2013/0159519 | A1* | 6/2013 | Hochberg | G06Q 50/01 709/225 |
| 2014/0172915 | A1* | 6/2014 | Herbach | H04L 63/105 707/781 |
| 2014/0337634 | A1* | 11/2014 | Starner | H04L 9/3231 713/186 |
| 2015/0350220 | A1* | 12/2015 | Espinosa | H04L 63/102 726/28 |
| 2017/0228551 | A1* | 8/2017 | Fausak | G06F 21/6218 |

* cited by examiner

*Primary Examiner* — Hannah S Wang
(74) *Attorney, Agent, or Firm* — Kunzler Bean & Adamson, PC

(57) ABSTRACT

Apparatuses, methods, systems, and program products are disclosed for selectively accessing content from a content pool. A method includes receiving content for a content-pool from a content contributor. A method includes determining one or more access settings for the content, the one or more access settings determining how the content is displayed. A method includes providing the content to a presenter according to the one or more access settings.

16 Claims, 8 Drawing Sheets

APPARATUSES, SYSTEMS, AND METHODS FOR SELECTIVE ACCESSIBILITY OF CONTENT FROM A CONTENT-POOL

CROSS-REFERENCES TO RELATED APPLICATIONS

This application claims the benefit of U.S. Provisional Patent Application No. 62/397,187 entitled "APPARATUSES, SYSTEMS, AND METHODS FOR SELECTIVE ACCESSIBILITY OF CONTENT FROM A CONTENT-POOL" and filed on Sep. 20, 2016 for Narendra Singh Maan, which is incorporated herein by reference.

FIELD

The present disclosure relates to a data processing system, more specifically, the present disclosure relates to selective accessibility of content from a content-pool.

BACKGROUND

Some websites source content from other websites for a variety of reasons, for example, for information, comparison, etc. The content may include text, status updates, location information, photos, videos, groups, events, and/or links to external websites as well as other pages in a social network, just to name a few. The content of the sourced website may be available to sourcing websites by optionally creating a login on the sourced website. Additionally, content once posted on the sourcing website may then made available to all the viewers of the sourcing websites.

While content may be made available to viewers in this manner, the sourced website cannot control the accessibility of the posted content on a granular level. Rather the sourced website may wish to curtain content access based upon who requested the content or which website can source content from it. Further, due to unrestricted posting of content, there may even be times when content contributors may not wish to post content online.

SUMMARY

Other aspects and advantages of the disclosure will become apparent from the following detailed description, taken in conjunction with the accompanying drawings, illustrating by way of examples the principles of the disclosure.

Methods for providing content from a content-pool are presented. A method, in one embodiment, includes receiving content for a content-pool from a content contributor. A method, in certain embodiments, includes determining one or more access settings for the content. In some embodiments, the one or more access settings determine how the content is displayed. A method, in a further embodiment, includes providing the content to a presenter according to the one or more access settings.

Apparatuses for providing content from a content-pool are presented. In one embodiment, an interface module receives content for a content-pool from a content contributor. In certain embodiments, a settings module determines one or more access settings for the content. In some embodiments, the one or more access settings determine how the content is displayed. In one embodiment, the interface module provides the content to a presenter according to the one or more access settings.

Program products for providing content from a content-pool are presented. In one embodiment, a program product includes a computer readable storage medium that stores code executable by a processor. In certain embodiments, the executable code includes code to perform receiving content for a content-pool from a content contributor. In a further embodiment, the executable code includes code to perform determining one or more access settings for the content. The one or more access settings may determine how the content is displayed. In various embodiments, the executable code includes code to perform providing the content to a presenter according to the one or more access settings.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
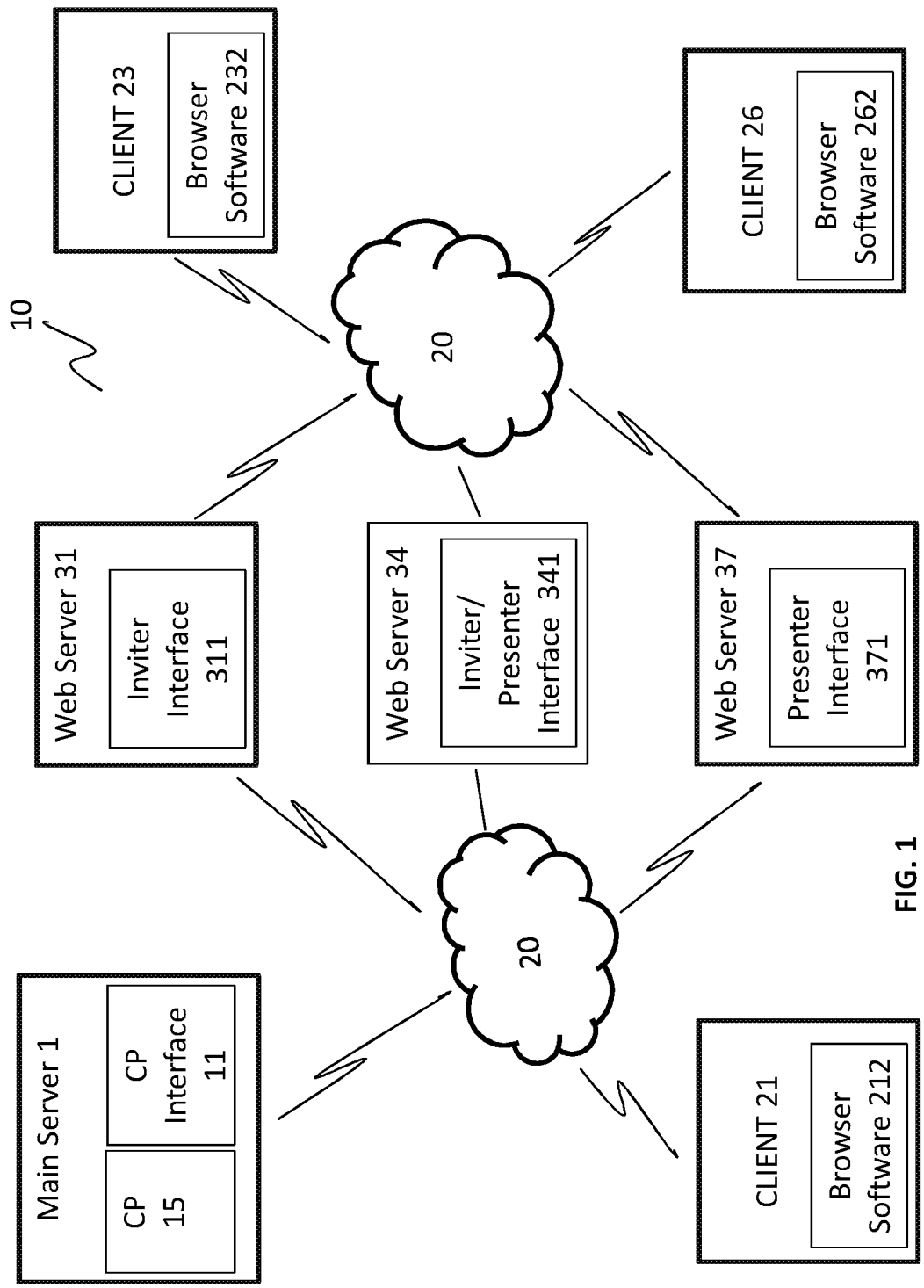
FIG. 1 is an example of a distributed system configured as client/server architecture used in an embodiment of the present disclosure.

Methods and systems for providing content from a content-pool based upon one or more access settings are disclosed. The following description is presented to enable any person skilled in the art to make and use the teachings of the present disclosure. For purposes of explanation, specific nomenclature is set forth to provide a thorough understanding of the present disclosure. Descriptions of specific applications are provided only as examples. Various modifications to the preferred embodiments will be readily apparent to those skilled in the art, and the general principles defined herein may be applied to other embodiments and applications without departing from the spirit and scope of the disclosure. Thus, the present disclosure is not intended to be limited to the embodiments shown, but is to be accorded the widest scope consistent with the principles and features disclosed herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Applications, software programs or computer readable instructions may be referred to as components or modules. Applications may be hardwired or hard coded in hardware or take the form of software executing on a general purpose computer such that when the software is loaded into and/or executed by the computer, the computer becomes an system for practicing the disclosure, or they are available via a web service. Applications may also be downloaded in whole or in part through the use of a software development kit or a toolkit that enables the creation and implementation of the present disclosure. In this specification, these implementations, or any other form that the disclosure may take, may be referred to as techniques. In general, the order of the steps of disclosed processes may be altered within the scope of the present disclosure.

In the present disclosure, the term "contributor" refers to an individual/entity that provides content on an inviter interface that is stored in the content-pool. The term "visitor" refers to an individual/entity who visits a presenter interface using a client. An "inviter interface" is an interface of a third-party who invites a contributor to contribute content on the inviter interface. This contributors' content is stored in the content-pool along with one or more set of access settings provided by the inviter interface. A "presenter interface" is an interface of a third-party who may present content on the presenter interface as provided by the content-pool. An "inviter/presenter interface" is an interface that can be an inviter interface, a presenter interface or both. The term "inviter access settings" refers to content access settings defined by the inviter interface for one or more of a contributor's content, a presenter interface or a visitor of a presenter interface. The term "presenter access settings" refers to content access settings for a visitor or an inviter interface defined by the presenter interface for the content of content-pool that can be provided to its interface.

Referring now to the drawings, FIG. 1 is an example of a distributed system 10 configured as a client/server architecture used in an embodiment of the present disclosure. The system 10 includes a main server 1 and a plurality of web servers (31, 34 and 37) communicating over a network 20. The main server 1 may also communicate with a client 21 directly over the network 20. The web servers (31, 34 and 37) communicate with one or more clients (23 and 26) through the network 20. The network 20 will be hereinafter generally referred to as the Internet. Although the system and method of the present disclosure is specifically useful for the Internet, it should be understood that the main server 1, web servers (31, 34 and 37) and clients (21, 23 and 26) may communicate with each other through one of a number of different types of networks. Such networks may include without limitation local area networks (LANs), other wide area networks (WANs), and regional networks accessed over telephone lines, such as commercial information services.

The main server 1 may be a remote computer system that is accessible over the network 20 such as the Internet. The main server 1 may include one or more processors, memories, input/output devices, and a network interface, such as a modem. The main server 1 may communicate with one or more server processes (of for example, web servers (31, 34 or 37)) or a client process of for example, client 21 over the network 20 that allows multiple servers/clients to take advantage of the information-gathering capabilities of the main server 1. The main server 1 essentially acts as an information provider for the web servers (31, 34 or 37).

The main server 1 hosts a content-pool 15 which receives content along with inviter access settings for a visitor and/or inviter access settings for a presenter interface (collectively referred as "inviter access settings") from the inviter interface 311 and inviter/presenter interface 341. The inviter interfaces 311 and 341 in turn receive content from their respective contributors who may either contribute content voluntarily or upon request from the respective inviter interfaces 311 and 341. Additionally and optionally, the content-pool 15 may receive presenter access settings for a visitor and/or presenter access settings for an inviter interface (collectively referred as "presenter access settings") from the inviter/presenter interface 341 and presenter interface 371. The content-pool 15, when queried by a web server (31, 34 or 37) provides details of the content being queried depending upon one or more inviter access settings and/or presenter access settings defined in the content-pool 15. The inviter access settings and presenter access settings are explained in detail in FIG. 2.

Each of the web servers (31, 34 and 37) may include one or more processors, memories, input/output devices, and a network interface, such as a modem. In addition, the web servers (31, 34 and 37) host one or more web pages of the respective interfaces (311, 341 and 371). In the depicted example, interface 311 is the inviter interface, interface 341 is the inviter/presenter interface, and interface 371 is the presenter interface. The interface includes without limitation a website, a web application, a web server API based UI and an iFrame.

The clients (23, 26, and 21) can be conventional personal computers (PCs), workstations, or computer systems of any other size. For example, client 23 may be a laptop, client 26 may be a smartphone, while client 21 may be a desktop. Each client (23, 26, or 21) may include one or more processors, memories, input/output devices, and a network interface, such as a modem. A "client" may be considered as a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the server program or the server itself. In networked systems, a client process usually runs on a computer that accesses shared network resources provided by another computer running a corresponding server process. However, it should also be noted that it is possible for the client process and the server process to run on the same computer.

The clients (23 and 26) communicate through the network 20 with web servers (31, 34 or 37) using the functionality provided by a HyperText Transfer Protocol (HTTP), although other communications protocols, such as File Transfer Protocol (FTP), Simple Network Management Protocol (SNMP), TELNET, and a number of other protocols known in the art, may be used. Similarly, client 21 may communicate with the main server 1 using the functionality provided by any of the aforesaid protocols.

The clients (23, 26 and 21) can execute respective web browser programs (232, 262 and 212) such as the Internet Explorer, Firefox, Chrome, Safari or Opera, desktop or mobile applications built for Windows, Mac, iOS, Android, Blackberry, browser extensions and add-ons etc. to locate web pages or records stored on one or more servers (1, 31, 34 and 37). The web pages can be data records including plain textual information, or more complex digitally encoded multimedia speaker, such as software programs, graphics, audio signals, videos, and so forth. Through the web pages, a client may either contribute or view content.

It will be appreciated from the description below that the system and method of the present disclosure may be implemented in software that is stored as executable instructions on a computer storage medium, such as memories or mass storage devices, on the main server 1. Further details of the content-pool 15 are as described in FIG. 2.

Figure 2:
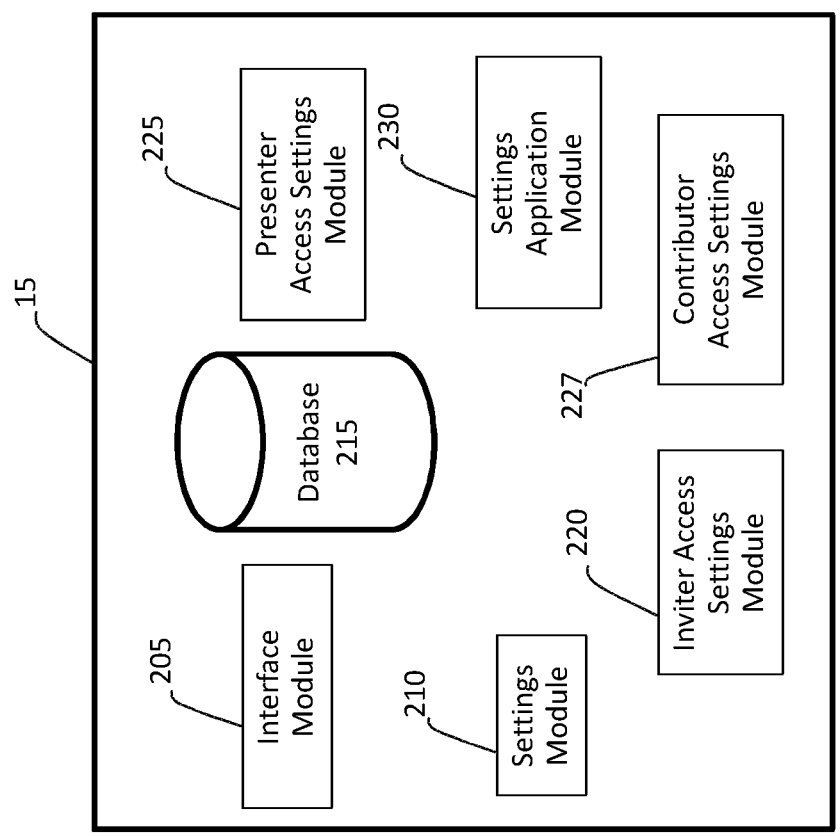
FIG. 2 is an exemplary modular diagram of a content-pool hosted on a main server 1.

FIG. 2 is an exemplary block diagram of various modules of the content-pool 15. The content-pool 15 includes an interface module 205, a settings module 210, a database 215, an inviter access settings module 220, a presenter access settings module 225, a contributor access settings module 227 and a settings application module 230.

Interface module 205 deals with requests from one or more web servers (31, 34 and 37) on which, the respective interfaces 311, 341 and 371 are hosted. For example, the request may be received from the web server 31 to store a contributor's content along with inviter access settings for the contributors' content. Or, the request may be received from the web server 37 to store presenter access settings and/or provide content for the presenter interface 371. The interface module 205 also deals with sending content to an inviter interface or presenter interface.

The settings module 210 contains settings relating to an inviter interface, a presenter interface, and/or a contributor interface, such as reception of inviter's access settings/presenter's access settings/contributor's access settings based upon predefined activities, which may include signing-up for, registering for, or creating a new account, attending a session/presentation and getting a code that can be input later by a user to gain access to the content, paying for access to content, and/or the like, before a visitor to a presenter's interface is presented the content from content-pool 15. For example, a website may want to display job listing from the content pool 15 on their website. However, the website may only want to enable access to the job listings to visitors who have signed-up or created an account at the website. Once the visitor has registered with the web site, the visitor may gain access to viewing one or more job listings on the website. These settings may be default settings or configured by the administrator of the inviter interface and/or present interface.

Additionally and optionally, the settings module 210 contains preference(s) for sorting content to be provided on a presenter interface. The preferences for sorting content include a date/time, a ranking, an alphabetical order, a relevance, a geographic location, or the like.

The database 215 stores content, inviter access settings, presenter access settings and/or other information required for functioning of the content-pool 15.

The inviter access settings module 220 enables an inviter interface to define inviter access settings for their respective contributor's content. For example, the inviter interface defines in the inviter access settings module 220, inviter access settings for a presenter interface(s) on which the contributor's content is to be displayed, or for a visitor of a presenter interface who may wish to access the contributor's content.

Inviter access settings for the presenter interface include without limitation name/URL of a presenter interface, location of the presenter interface, nature of industry, size, market capital and combinations thereof pertaining to the presenter interface. For example, the inviter access settings module 220 may specify in the inviter access settings that an article written by a contributor in New York City only be accessible to presenter interfaces and/or visitors of the presenter interfaces that are located in the New York City area. Additionally and optionally, inviter access settings for the presenter interface include without limitation providing full or a varying level of content view on the presenter interface, the varying level of content view includes for example, a certain portion of full content, content without any call-to-action, first few lines of the content, etc. For example, the inviter access settings module 220 may specify in the inviter access settings that only a portion of an article by a syndicated columnist may be posted on the presenter interface unless the presenter pay a predefined fee to access the full article.

The inviter access settings for a visitor of the presenter interface include without limitation gender, ethnicity, work details, education details, skills, current location, language, work location, education location, religion, political belief, interests, career aspirations, marriage status and combinations thereof of the visitor. For example, the inviter access settings module 220 may specify in the inviter access settings that a blog post may only be accessible to visitors of the presented interface if the visitor is a registered user that is female and is older than 25 years old. Additionally and optionally, inviter access settings for the visitor include without limitation providing full or a varying level of content view on the presenter interface for the visitor based upon the visitor details like gender, ethnicity, work details, education details, skills, current location, language, etc. The varying level of content view includes for example, a certain portion of full content, content without any call-to-action, first few lines of the content, etc. For example, the inviter access settings module 220 may specify in the inviter access settings that only a portion of an article by a syndicated columnist may be viewed by a visitor of the presenter interface unless the visitor and/or the presenter pay a predefined fee to access the full article.

The presenter access settings module 225 enables a presenter interface to define presenter access settings for their visitors or inviter interface(s) which provide content to the content-pool 15 which in turn is displayed on the presenter interface. The presenter access settings for a visitor include for example, gender, ethnicity, work details, education details, skills, current location, language, work location, education location, religion, political belief, interests, career aspirations, marriage status, etc. of the visitor. Additionally and optionally, the presenter access settings for the visitor include without limitation providing full or a varying level of partial content. The partial content can be certain portion of full content, content without any call-to-action, first few lines, etc. In some embodiments, the visitor's access to content is dependent on performing one or more predefined activities, which may include signing-up for, registering for, or creating a new account, attending a session/presentation and getting a code, paying for access, and/or the like, before a visitor to a presenter's interface is presented the content from content-pool 15.

The presenter access settings for an inviter interface include without limitation name/URL of an inviter interface, location of the inviter interface, nature of industry, size, market capital and combinations thereof pertaining to the inviter interface. For example, the presenter access settings module 225 may specify in the presenter access settings that tweets about the iPhone® may only be accessible to visitors that work in a computer-technology industry. Additionally and optionally, the presenter access settings for an inviter interface include without limitation providing full or a varying level of content view on the presenter interface based upon an attribute relating to the inviter interface like name/URL of an inviter interface, location of the inviter interface, nature of industry, size, market capital and combinations thereof. The varying level of content view includes for example, a certain portion of full content, content without any call-to-action, first few lines of the content, etc. For example, the presenter access settings module 225 may specify in the presenter access settings that only the first five lines of an article may be accessed unless a visitor fills out a survey.

As with the presenter access settings for an inviter interface and a visitor interface, in one embodiment, the presenter access settings may include access settings for a contributor. For example, a presenter may create access settings that specify that a presenter interface only present content from contributors that are in Fortune 500 companies. Other characteristics may be used to filter contributor content, such as the name/URL of the contributor, location of the contributor, nature of industry, size, market capital and combinations thereof of the contributor. Additionally and optionally, the presenter access settings for the contributor include without limitation providing full or a varying level of partial content. The partial content can be certain portion of full content, content without any call-to-action, first few lines, etc. In some embodiments, the opportunity for the contributor to have his/her content presented by the presenter is dependent on performing one or more predefined activities such as signing-up for an account, obtaining a code, paying to have their content presented by the presenter, and/or the like.

The contributor access settings module 227 enables a contributor to define presenter access settings for content provided by the contributor and displayed on an interface of the presenter. The contributor access settings for a presenter include for example, name, location, nature of industry, size, and market capital, etc. of the presenter. For example, a contributor may specify in the contributor settings that an image provided by the contributor to the content-pool 15 may only be displayed by a presenter located in the United States. Additionally and optionally, the contributor access settings for the presenter include without limitation providing full or a varying level of partial content. The partial content can be certain portion of full content, content without any call-to-action, first few lines, etc.

The contributor access settings module 227, in some embodiments, enables a contributor to define contributor access settings for their visitors or inviter interface(s) that provide content to the content-pool 15, which in turn is displayed on the presenter interface. The contributor access settings for a visitor include for example, gender, ethnicity, work details, education details, skills, current location, language, work location, education location, religion, political belief, interests, career aspirations, marriage status, etc. of the visitor. For example, a contributor may specify in the contributor settings that an article provided by the contributor to the content-pool 15 may only be displayed to visitors that speak Spanish.

The settings application module 230 is responsible for applying inviter access settings and/or presenter access settings on content whenever a request for content is received by the interface module 205. The settings application module 230 checks various settings configured in the settings module 210 and accordingly obtains relevant access settings from inviter access settings module 220 and/or a presenter access settings module 225. The settings application module 230 applies the stricter of the inviter access settings and the presenter access settings to the requested content and provides the same to the interface module 205 to be sent to the client. For example, if the presenter access settings include more restrictions on which visitors may view a video than the inviter access settings, then the settings application module 230 may apply the presenter access settings to the video.

Figure 3:
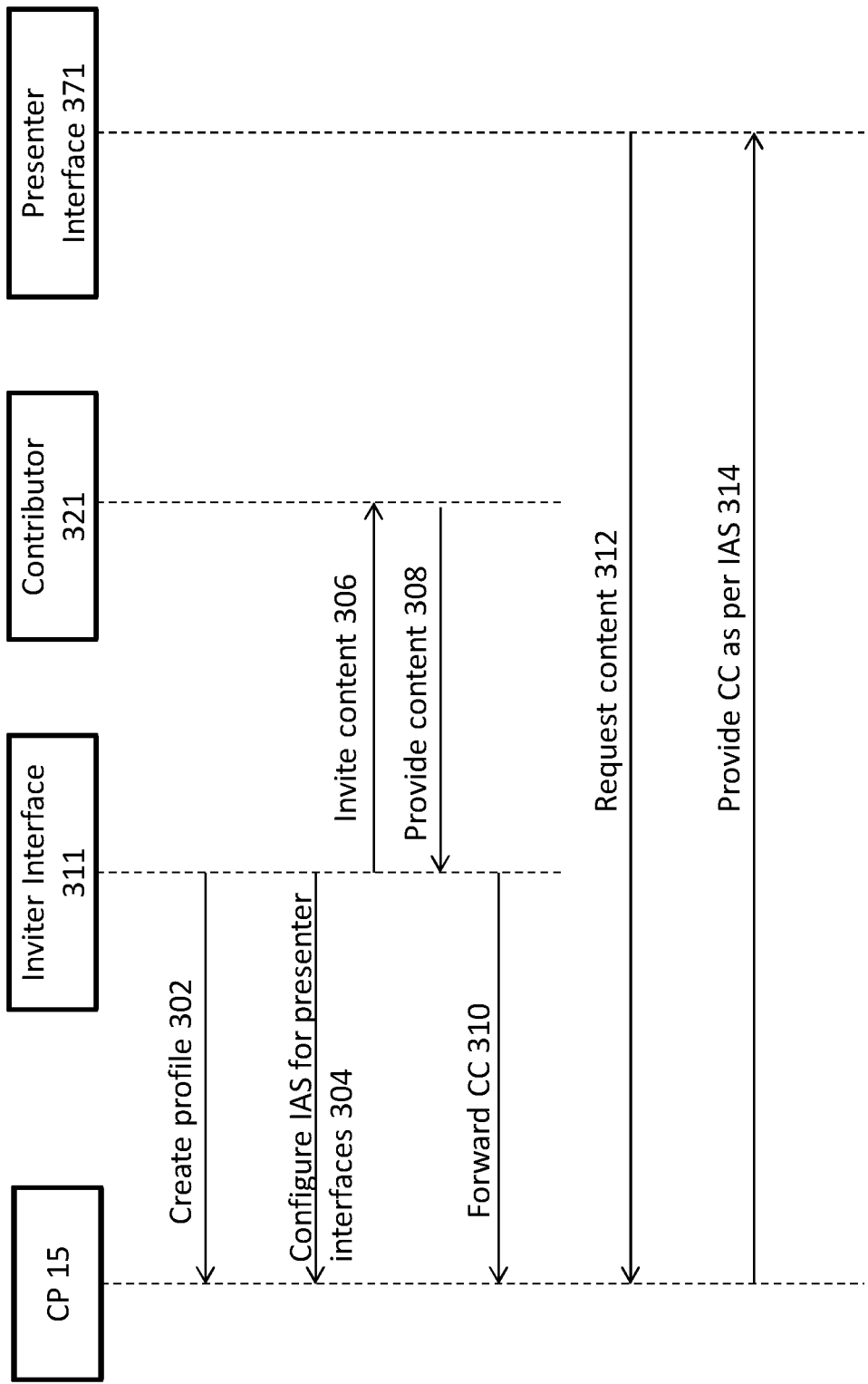
FIG. 3 is an exemplary flow diagram for providing content to presenter interface from the content-pool based upon inviter access settings configured for presenter interfaces.

FIG. 3 is an exemplary flow diagram for providing content to presenter interface 371 from the content-pool 15 based upon inviter access settings configured for presenter interfaces. At 302, inviter interface 311 creates a profile with the content-pool 15. Creating of the profile includes for example, providing a uniform resource locator (URL) of the inviter interface, name of the inviter interface, or the like. Alternately, a profile may be created using a social media profile (for example, Facebook®, Twitter®, etc.) of the inviter interface. Optionally, the content-pool 15 may require the inviter interface to attend a session and verify a code before the inviter interface 311 can configure inviter access settings.

At 304, the inviter interface 311 configures one or more inviter access settings for presenter interfaces on which the content provided by inviter interface 311 is to be displayed. In an embodiment, an administrator of the inviter interface 311 may select and save inviter access settings for presenter interface 371 of interest to them. The inviter access settings for presenter interfaces can be referred from FIG. 2. The content-pool 15 is to apply the inviter access settings for presenter interfaces on content provided by inviter interface 311 whenever such content is requested by the presenter interface 371. This enables the inviter interface 311 to control where its content can be presented. In various embodiments, inviter access settings for presenter interfaces by an inviter interface may be same for all presenter interfaces or different.

At 306, the inviter interface 311 sends a request to a contributor 321 for content. The request may be sent by way of an email, a message, a short messaging service, etc. The contributor willing to provide content, accesses the inviter interface 311 at 308. The contributor 321 provides the content by way of email, filling fields displayed on the inviter interface 311, or the like. The inviter interface 311 in turn forwards the contributor's content to the content-pool 15 at 310.

At 312, the presenter interface 371 requests for content from the content-pool 15 that the presenter interface 371 wishes to display. The presenter interface 371 may request content due to a request from a visitor or otherwise required during loading the interface. The content-pool 15 obtains the inviter access settings for presenter interfaces defined by the inviter interface 311 from the database 315 and applies the inviter access settings to the content. The content-pool 15 then provides this content to the presenter interface 371 at 314. For example, if the inviter access settings relate to providing a partial view of the content to interfaces other than the inviter interface, the content-pool 15 will provide a partial view of the content to the presenter interface 371. However, in this example, if the inviter interface and the presenter interface (like, interface 341) were the same, then full-view of the content would be provided.

Figure 4:
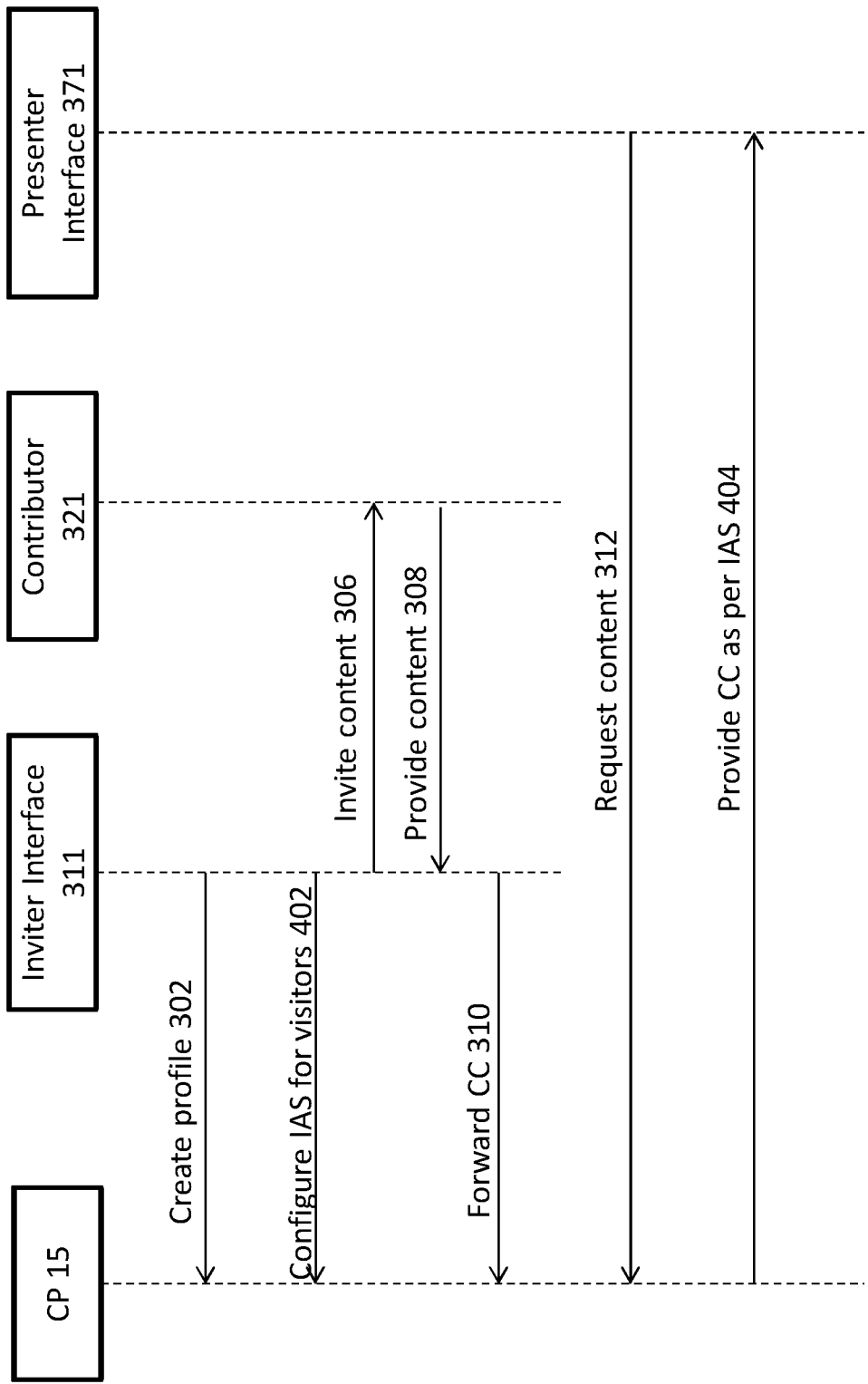
FIG. 4 is an exemplary flow diagram for providing content to presenter interface from the content-pool based upon inviter access settings configured for visitors of the presenter interface.

FIG. 4 is an exemplary flow diagram for providing content to presenter interface 371 from the content-pool 15 based upon inviter access settings configured for visitors of the presenter interface 371. After 302, the inviter interface 311 configures one or more inviter access settings for visitors of presenter interfaces who request content in their respective presenter interfaces at 402. In an embodiment, an administrator of the inviter interface 311 may select and save inviter access settings for visitors of interest to them. The inviter access settings for visitors can be referred from FIG. 2. The content-pool is to apply the inviter access settings for visitors on content provided by the inviter interface 311 whenever such content is requested by a visitor of the presenter interface 371. This enables the inviter interface 311 to control who can access its content.

The description of 306, 308, 310 and 312 may be referred from FIG. 3 and not repeated to avoid being verbose. The content-pool 15 optionally requests for visitor details from the presenter interface 371 to be able to apply the inviter access settings using received visitor details. The content-pool 15 obtains the inviter access settings for visitors defined by the inviter interface 311 from the database 315 and applies the inviter access settings to the content. The content-pool 15 then provides this content to the presenter interface 371 at 404. For example, if the inviter access settings relate to providing a partial view of the content to visitors residing in the US, then if the location of the visitor is the US, the content-pool 15 will provide a partial view of the content to the presenter interface 371.

Figure 5:
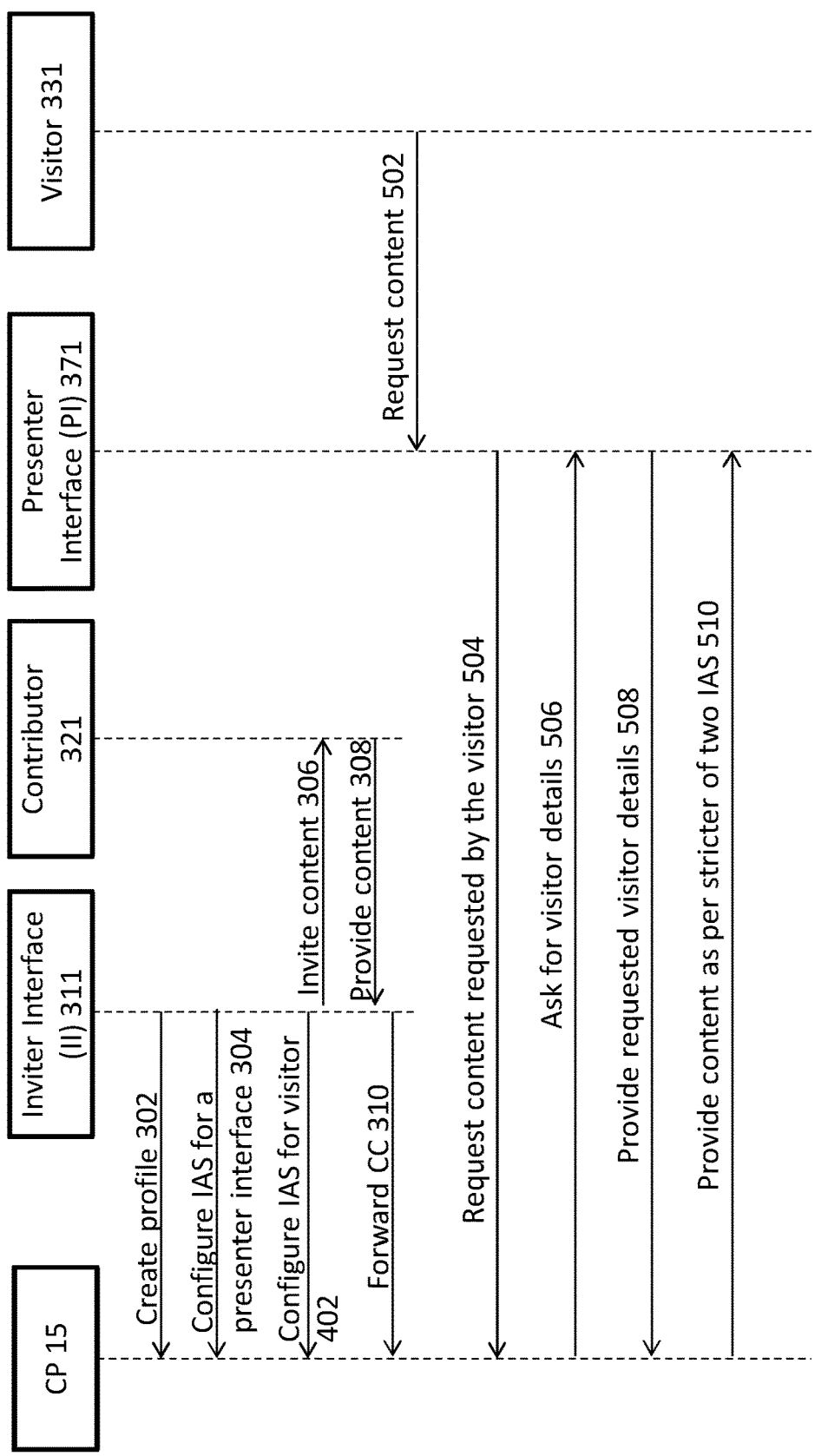
FIG. 5 is an exemplary flow diagram for providing content to a presenter interface from the content-pool based upon inviter access settings configured for presenter interfaces and visitors.

FIG. 5 is an exemplary flow diagram for providing content to a presenter interface from the content-pool based upon inviter access settings configured for presenter interfaces and visitors. The description of 302, 304, 402, 306, 308 and 310 may be referred from FIGS. 3 and 4 and not repeated to avoid being verbose. At 502, visitor 331 requests for content on the presenter interface 371. The visitor 331 may request this content by clicking a button in the presenter interface 371. The presenter interface 371 may in turn request the content from content-pool 15 at 504. Optionally, the content-pool 15 may seek details of the visitor 331 from the presenter interface 371 at 506 and receive the same at 508. The details of the visitor may be required to apply inviter access settings for visitors which may be based on the name, profile or other details of the visitor 331 as explained in FIG. 2.

The content-pool 15 obtains the inviter access settings for presenter interfaces and visitors defined by the inviter interface 311 and applies the stricter of the two settings on the requested content. For example, if the presenter access settings include more restrictions on which visitors may view a video than the inviter access settings, then the settings application module 230 may apply the presenter access settings to the video. Thereafter, the content-pool 15 provides this content to the presenter interface 371 at 510.

Figure 6:
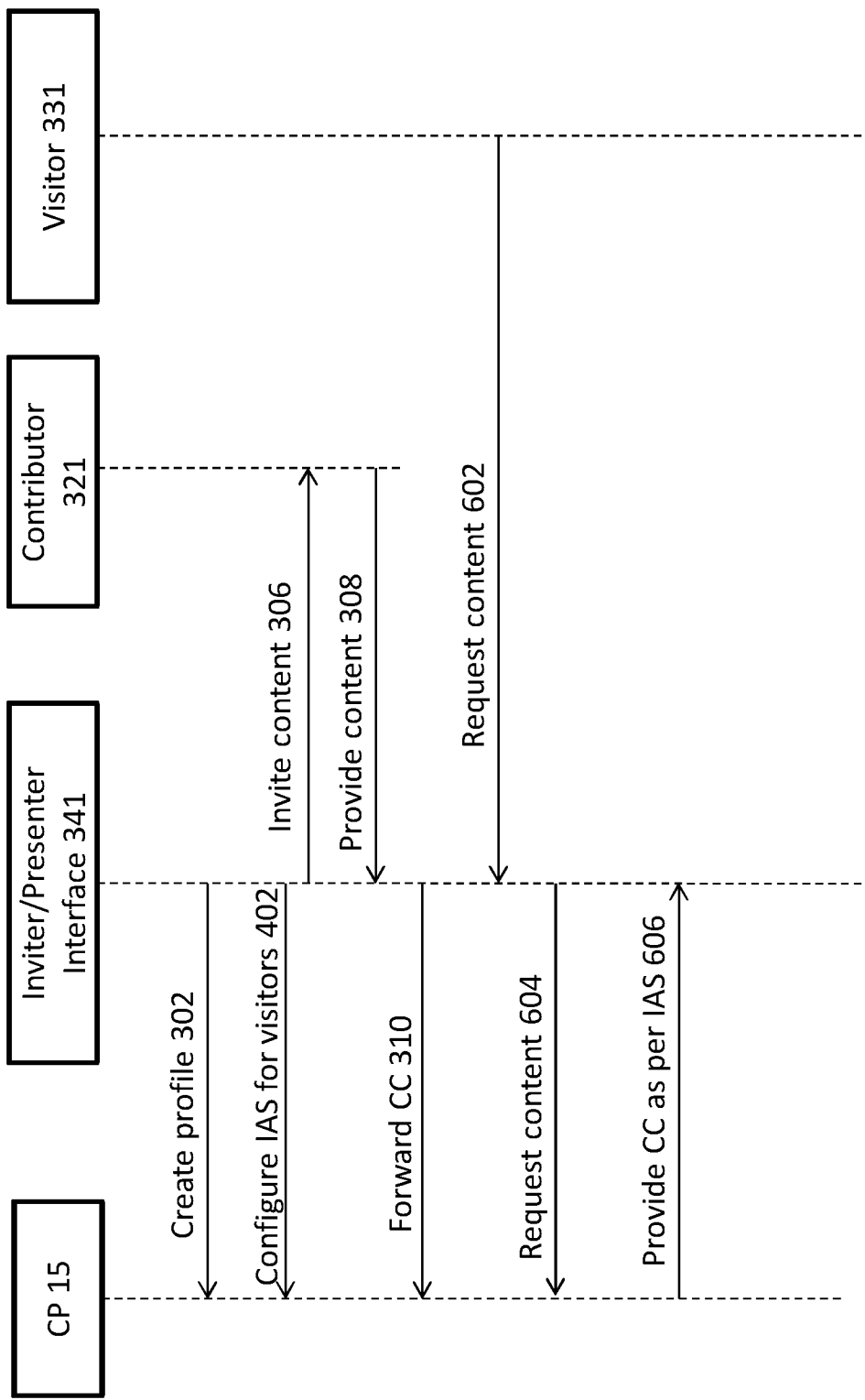
FIG. 6 is an exemplary flow diagram for providing content to visitor of the inviter/presenter interface from the content-pool 5 based upon inviter access settings configured for visitors.

FIG. 6 is an exemplary flow diagram for providing content to visitor 331 of the inviter/presenter interface 341 from the content-pool 15 based upon inviter access settings configured for visitors. The description of 302, 402, 306, 308 and 310 may be referred from FIGS. 3 and 4 and not repeated to avoid being verbose. At 602, visitor 331 of the inviter/presenter interface 341 requests for content. The inviter/presenter interface 341 forwards the request to content-pool 15. The content-pool 15 obtains the inviter access settings for visitors defined by the inviter/presenter interface 341 from database 215. In an embodiment, it is possible that the administrator of the inviter/presenter interface 341 may define inviter access settings for presenter interfaces as well along with inviter access settings for visitors. However, given that the inviter interface and the presenter interface is the same, the content-pool will not apply the inviter access settings for presenter interfaces in this context. The content-pool 15 obtains and applies the inviter access settings for visitors on the content and sends it to the inviter/presenter interface 341 at 606. Optionally, before sending the content, the content-pool may seek for visitor details from the inviter/presenter interface 341 before applying the settings and then apply the settings.

Figure 7:
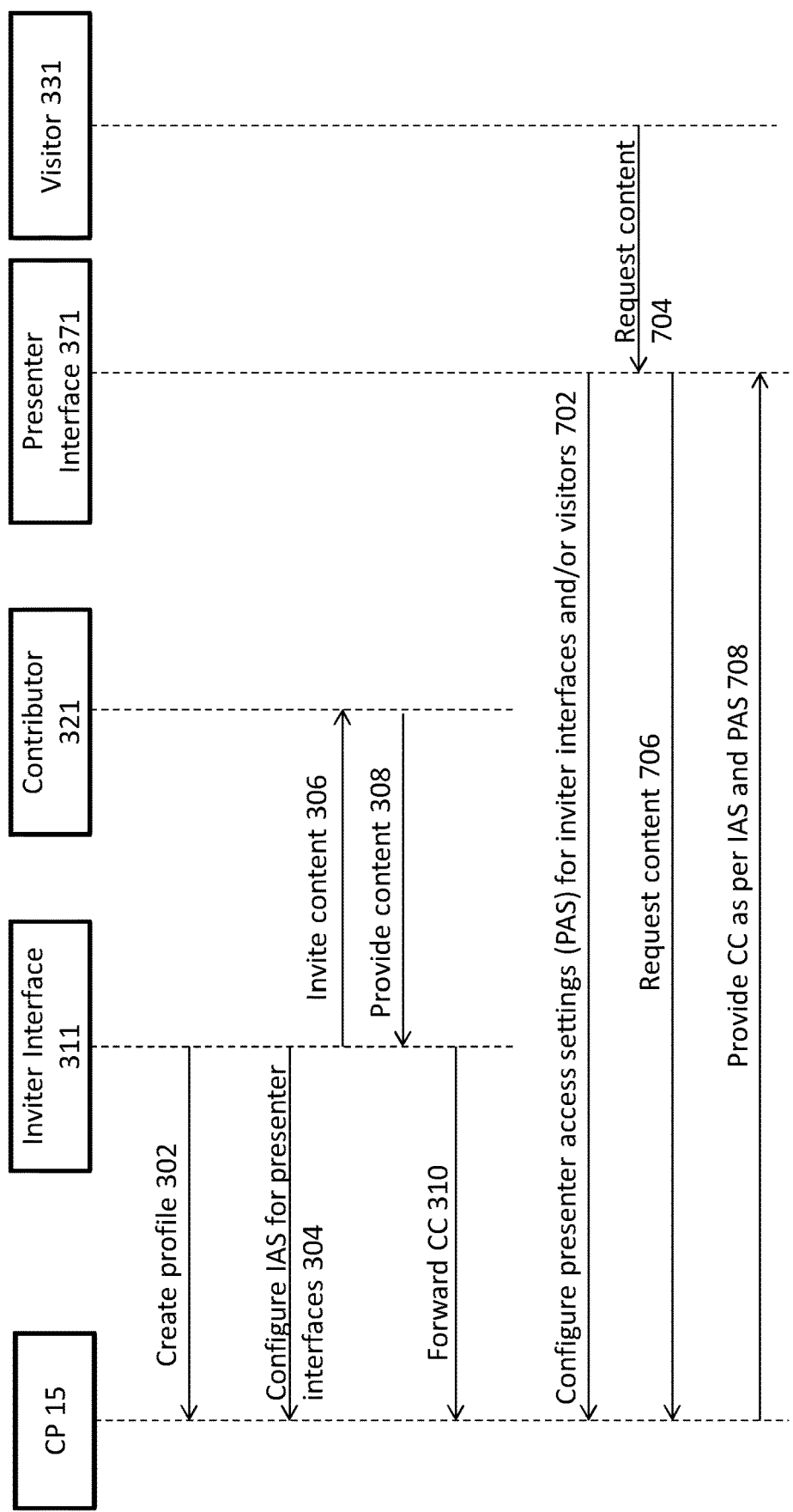
FIG. 7 is an exemplary flow diagram for providing content to visitor of the presenter interface from the content-pool based upon inviter access settings configured for presenter interfaces and presenter access settings.

FIG. 7 is an exemplary flow diagram for providing content to visitor 331 of the presenter interface 371 from the content-pool 15 based upon inviter access settings configured for presenter interfaces and presenter access settings. The description of 302 to 310 may be referred from FIG. 3 and not repeated to avoid being verbose. At 702, presenter interface 371 configures presenter access settings (PAS) for inviter interfaces and/or visitors of its interface. The administrator of the presenter interface 371 selects the settings of interest and saves them in the content-pool 15. Optionally, the presenter interface 371 may provide presenter access settings for the inviter interface 311 or the presenter access settings for the visitor for sorting the content before providing the content in the presenter interface 371.

At 704, visitor 331 of the presenter interface 371 requests content. The presenter interface 371 forwards the request to content-pool 15 at 706. The content-pool 15 obtains the inviter access settings for presenter interfaces and presenter access settings for inviter interfaces and/or visitors from database 215. The content-pool 15 applies the stricter of the two settings on the content and provides the content to the presenter interface 371 at 708.

Figure 8:
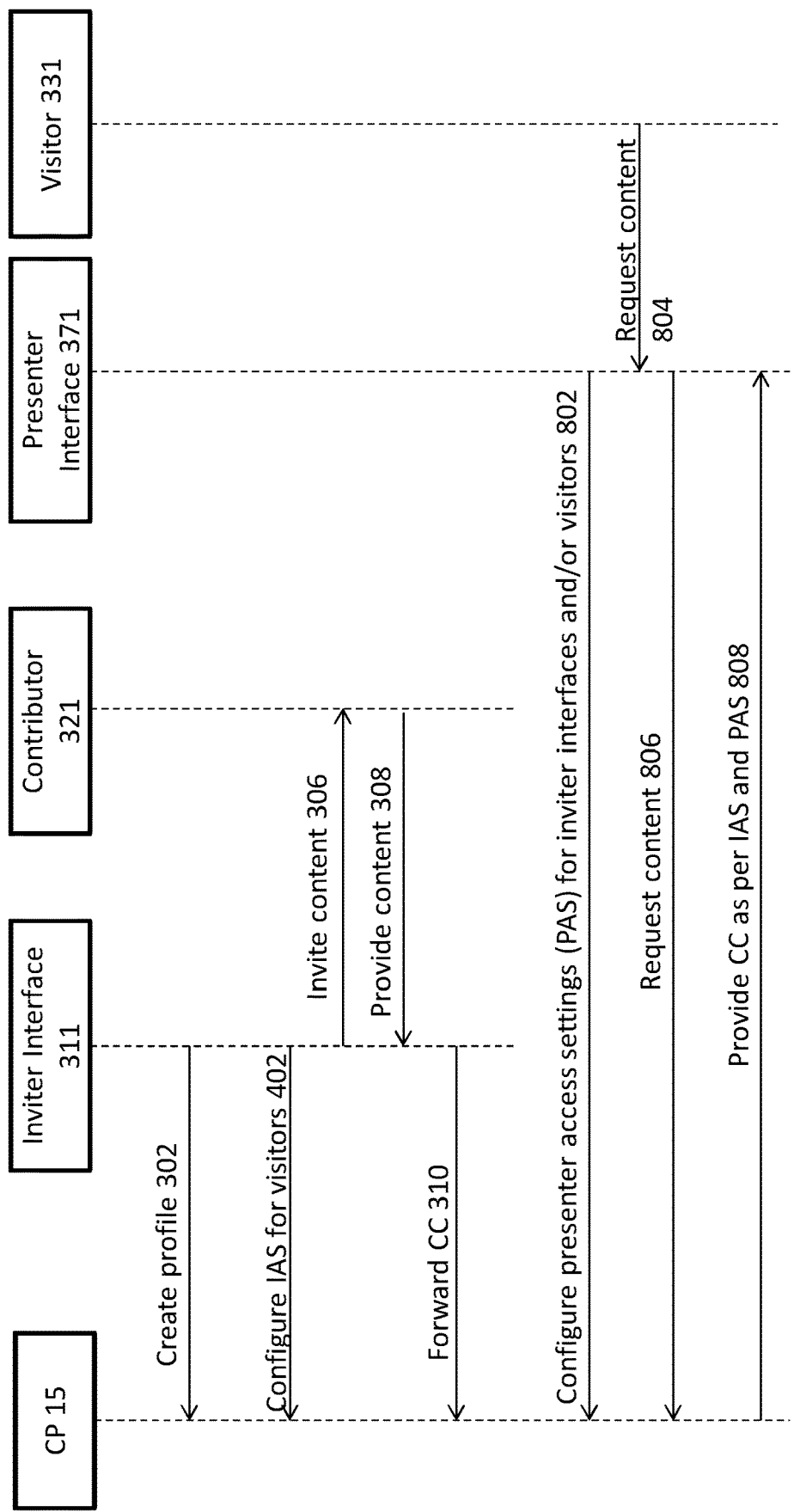
FIG. 8 is an exemplary flow diagram for providing content to visitor of the presenter interface from the content-pool based upon inviter access settings configured for visitors and presenter access settings.

FIG. 8 is an exemplary flow diagram for providing content to visitor 331 of the presenter interface 371 from the content-pool 15 based upon inviter access settings configured for visitors and presenter access settings. The description of 302, 402, 306 to 310 may be referred from FIG. 3/FIG. 4 and not repeated to avoid being verbose. At 802, presenter interface 371 configures presenter access settings (PAS) for inviter interfaces and/or visitors of its interface. The administrator of the presenter interface 371 selects the settings of interest and saves them in the content-pool 15. Optionally, the presenter interface 371 may provide presenter access settings for the inviter interface 311 or the presenter access settings for the visitor for sorting the content before providing the content in the presenter interface 371.

At 804, visitor 331 of the presenter interface 371 requests for content. The presenter interface 371 forwards the request to content-pool 15 at 806. The content-pool 15 obtains the inviter access settings for visitors and presenter access settings for inviter interfaces and/or visitors from database 215. The content-pool 15 applies the stricter of the two settings on the content and provides the content to the presenter interface 371 at 808.

From the above, it is evident that the present disclosure offers several advantages for example, an interface providing content is able to control who/where the content can be presented. This in turn, addresses the rampant problem to misuse of content which is available for all to use.

It should be noted that the above steps are exemplary steps and the order of execution of the steps may be altered or one or more steps may be omitted or other steps can be clubbed to the outlined exemplary steps. Such variations are within the scope and teachings of the present disclosure.

It should be noted that the teachings of the present disclosure can be applied individually or features of various embodiments described above may be combined together. Such variations are within the scope and spirit of the present disclosure. For example, in one embodiment, the content-pool may provide a hook to the inviter interfaces/presenter interfaces via which the content and/or inviter access settings and presenter access settings may be configured. The hook can be for example, a widget, a browser extension, a plugin, an application programming interface (API) of a web server, an iFrame and a Java object.

It will be appreciated that variations of the above disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   inviting, at a first web server hosting an inviter interface, a content contributor to provide content to a content-pool that is accessible to the inviter interface on the first web server, and receiving, at the first web server, the content for the content-pool from the content contributor in response to a first request from the inviter interface, and sending the content from the first web server to the content-pool, wherein the content contributor defines contributor access settings to access the content which comprise settings for a presenter interface and settings for a visitor of the presenter interface, and wherein the inviter interface defines inviter access settings to access the content which comprise settings for the presenter interface and settings for the visitor of the presenter interface;

detecting the visitor visiting the presenter interface of a second server, via a client device, to access the content in the content-pool;

sending, from the second web server hosting the presenter interface, a second request to access the content in the content-pool, wherein the presenter interface defines presenter access settings to access the content which comprise settings for the inviter interface, settings for the visitor of the presenter interface, and settings for the content contributor;

hosting the content-pool at a main server and storing at the main server the content from the first web server in the content-pool, wherein the main server receives, from the inviter interface, the inviter access settings for the presenter interface and the inviter access settings for the visitor of the presenter interface, and wherein the main server receives, from the presenter interface, the presenter access settings for the inviter interface and the presenter access settings for the visitor of the presenter interface;

receiving, at the main server, the second request to access the content from the presenter interface of the second web server, and determining access settings to apply to the content that control how the content is displayed in the presenter interface to the visitor based on the contributor access settings, the inviter access settings, and the presenter access settings, and providing, from the content-pool, the content to the presenter interface according to the determined access settings, wherein the main server identifies which one of the inviter access settings and the presenter access settings is more restrictive and presents the content according to the more restrictive access settings.

2. The method of claim 1, wherein the inviter access settings comprise one or more of a name, location, nature of industry, size, and market capital of the presenter interface.

3. The method of claim 2, the inviter access settings for the visitor of the presenter interface comprising one or more of gender, ethnicity, work details, education details, skills, current location, language, work location, education location, religion, political belief, interests, career aspirations, and marriage status of the visitor.

4. The method of claim 3, wherein the inviter access settings specify how much of the content is displayed by the presenter interface, wherein the presenter interface displays one of a certain portion of the content, the content without a call-to-action, and a predetermined number of lines of the content.

5. The method of claim 3, further comprising accessing the content by the visitor in response to completion of one or more predefined activities, the one or more predefined activities comprising one or more of signing-up for an account, attending a presentation and getting a code, and paying for access.

6. The method of claim 1, wherein the presenter access settings for the inviter interface and the content contributor comprise one or more of a name, location, nature of industry, size, and market capital of the inviter interface and the content contributor.

7. The method of claim 6, the presenter access settings for the visitor of the presenter interface comprising one or more of gender, ethnicity, work details, education details, skills, current location, language, work location, education location, religion, political belief, interests, career aspirations, and marriage status of the visitor.

8. The method of claim 7, wherein the presenter access settings specify how much of the content is displayed by the presenter interface, wherein the presenter interface displays one of a certain portion of full content, the content without a call-to-action, and a predetermined number of lines of the content.

9. The method of claim 7, further comprising accessing the content by the visitor in response to completion of one or more predefined activities, the one or more predefined activities comprising one or more of signing-up, attending a session, and getting a code.

10. The method of claim 1, wherein the contributor access settings comprising one or more of a name, location, nature of industry, size, and market capital of the presenter interface.

11. The method of claim 10, the contributor access settings for the visitor of the presenter interface comprising one or more of gender, ethnicity, work details, education details, skills, current location, language, work location, education location, religion, political belief, interests, career aspirations, and marriage status of the visitor.

12. The method of claim 11, wherein the contributor access settings specify how much of the content is displayed by the presenter interface, wherein the presenter interface displays one of a certain portion of the content, the content without a call-to-action, and a predetermined number of lines of the content.

13. The method of claim 11, further comprising accessing the content by the visitor in response to completion of one or more predefined activities, the one or more predefined activities comprising one or more of signing-up, attending a session, and getting a code.

14. The method of claim 1, further comprising sorting the content displayed on of the presenter interface, wherein the displayed content is sorted by one of a date, a ranking, an alphabetical order, a relevance, and a geographic location.

15. An apparatus for providing content from a content pool, the apparatus A system comprising:

a memory storing computer readable program instructions;

a processor executing the computer readable program instructions to implement:

a first web server hosting an inviter interface, the first web server inviting a content contributor to provide content to a content-pool that is accessible to the inviter interface on the first web server, and receiving, at the first web server, the content for the content-pool from the content contributor in response to a first request from the inviter interface, and sending the content from the first web server to the content-pool, wherein the content contributor defines contributor access settings to access the content which comprise settings for a presenter interface and settings for a visitor of the presenter interface, and wherein the inviter interface defines inviter access settings to access the content which comprise settings for the presenter interface and settings for the visitor of the presenter interface;

a client device of the visitor visiting the presenter interface to access the content in the content-pool;

a second web server hosting the presenter interface, the second web server sending a second request to access the content in the content-pool, wherein the presenter interface defines presenter access settings to access the content which comprise settings for the inviter interface, settings for the visitor of the presenter interface, and settings for the content contributor;

a main server hosting the content-pool and the main server storing the content from the first web server in the content-pool, wherein the main server receives, from the inviter interface, the inviter access settings for the presenter interface and the inviter access settings for the visitor of the presenter interface, and wherein the main server receives, from the presenter interface, the presenter access settings for the inviter interface and the presenter access settings for the visitor of the presenter interface; and the main server receiving the second request to access the content from the presenter interface of the second web server and determining access settings to apply to the content that control how the content is displayed in the presenter interface to the visitor based on the contributor access settings, the inviter access, and the presenter access settings, and providing, from the content-pool, the content to the presenter interface according to the determined access settings, wherein the main server identifies which one of the inviter access settings and the presenter access settings is more restrictive and presents the content according to the more restrictive access settings.

16. A program product comprising a computer readable storage medium that stores code executable by a processor, the executable code comprising code to perform:

inviting, at a first web server hosting an inviter interface, a content contributor to provide content to a content-pool that is accessible to the inviter interface on the first web server, and receiving, at the first web server, the content for the content-pool from the content contributor in response to a first request from the inviter interface, and sending the content from the first web server to the content-pool, wherein the content contributor defines contributor access settings to access the content which comprise settings for a presenter interface and settings for a visitor of the presenter interface, and wherein the inviter interface defines inviter access settings to access the content which comprise settings for the presenter interface and settings for the visitor of the presenter interface;

detecting the visitor visiting the presenter interface of a second web server, via a client device, to access the content in the content-pool;

sending, from the second web server hosting the presenter interface, a second request to access the content in the content-pool, wherein the presenter interface defines presenter access settings to access the content which comprise settings for the inviter interface, settings for the visitor of the presenter interface, and settings for the content contributor;

hosting the content-pool at a main server and storing at the main server the content from the first web server in the content-pool, wherein the main server receives, from the inviter interface, the inviter access settings for the presenter interface and the inviter access settings for the visitor of the presenter interface, and wherein the main server receives, from the presenter interface, the presenter access settings for the inviter interface and the presenter access settings for the visitor of the presenter interface;

receiving, at the main server, the second request to access the content from the presenter interface of the second web server, and determining access settings to apply to the content that control how the content is displayed in the presenter interface to the visitor based on the contributor access settings, the inviter access settings, and the presenter access settings, and providing, from the content-pool, the content to the presenter interface according to the determined access settings, wherein the main server identifies which one of the inviter access settings and the presenter access settings is more restrictive and presents the content according to the more restrictive access settings.

* * * * *